United States Patent [19]

Kauneckas

[11] 4,001,846
[45] Jan. 4, 1977

[54] RECORDING SYSTEM FOR PHOTOGRAPHIC CAMERAS

[76] Inventor: John J. Kauneckas, 2301 E Street, NW., Washington, D.C. 20037

[22] Filed: Aug. 9, 1974

[21] Appl. No.: 496,314

[52] U.S. Cl. .............................. 354/105; 354/107; 354/109
[51] Int. Cl.² ........................................ G03B 17/24
[58] Field of Search .............. 354/105, 23 D, 60 L, 354/106, 107, 108, 109, 110; 240/103, 46.59; 355/39, 40; 352/90, 92

[56] References Cited

UNITED STATES PATENTS

| | | | |
|---|---|---|---|
| 2,298,588 | 10/1942 | Raymond | 240/103 |
| 2,784,306 | 3/1957 | Johnson | 240/103 |
| 3,452,196 | 6/1969 | Gray | 354/107 |
| 3,488,253 | 1/1970 | Tone et al. | 354/107 |
| 3,720,827 | 3/1973 | Hemphill | 240/46.59 |
| 3,750,553 | 8/1973 | Pfeifer | 354/105 |
| 3,827,070 | 7/1974 | Hoerenz | 354/105 |
| 3,882,512 | 5/1975 | Lawrence et al. | 354/109 |
| 3,909,137 | 9/1975 | Kisanuki | 354/60 L |
| 3,953,868 | 4/1976 | Kawamura et al. | 354/109 |

FOREIGN PATENTS OR APPLICATIONS 946,866 8/1956 Germany .......................... 354/105

*Primary Examiner*—Russell E. Adams, Jr.
*Attorney, Agent, or Firm*—Oblon, Fisher, Spivak, McClelland & Maier

[57] ABSTRACT

Several improvements are disclosed for a system which automatically photographically records information such as the aperture and shutter speed settings of a photographic camera on film negatives as they are exposed. The improvements include a light diffusing aperture structure for use with light emitting diode displays and several embodiments and structural features of selector switches which are used to control the light emitting diode displays. An electrical circuit is also disclosed illustrating the manner in which the various components of the present invention are combined and function in cooperation with a photographic camera.

13 Claims, 14 Drawing Figures

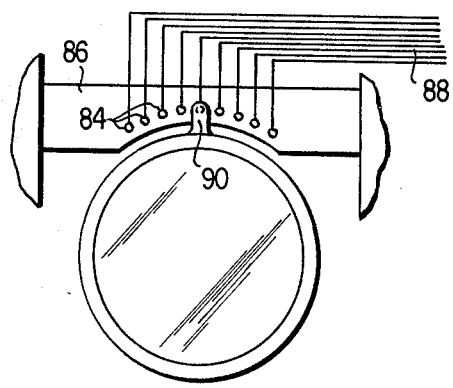
FIG.9A
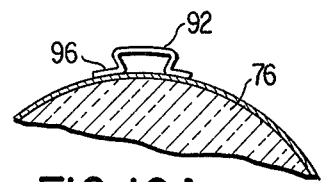
FIG.10A
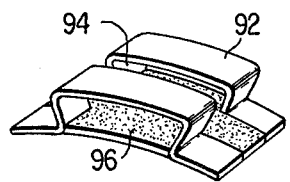
FIG.10B
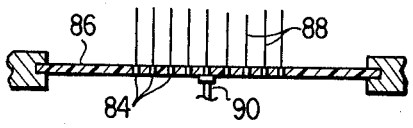
FIG.9B
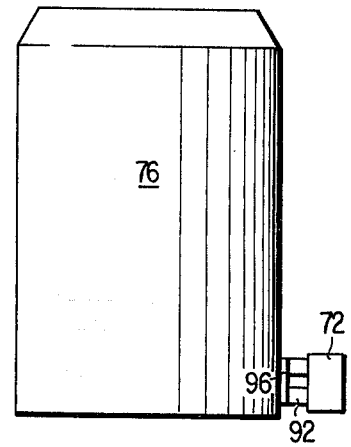
FIG.10C
FIG.11
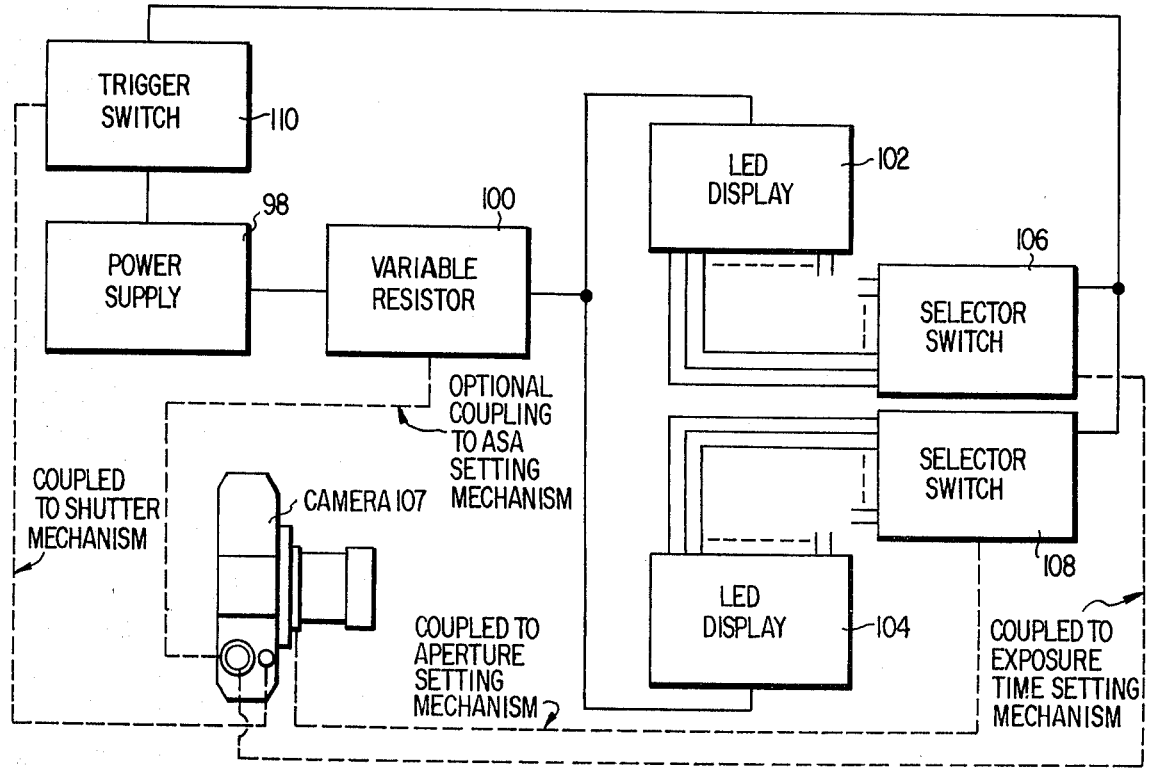

RECORDING SYSTEM FOR PHOTOGRAPHIC CAMERAS

CROSS-REFERENCE TO RELATED APPLICATIONS

The present application includes improvements on the invention disclosed in Application Ser. No. 400,695, filed Sept. 25, 1973 and now U.S. Pat. No. 3843956, and the disclosure thereof is hereby incorporated by reference.

BACKGROUND OF THE INVENTION

1. FIELD OF THE INVENTION

The present invention relates to improvements to a system for photographically recording information, and more particularly to improvements in a system for automatically recording camera settings on film.

2. DESCRIPTION OF THE PRIOR ART:

As is known from my previous application, reference above, a unique system for recording camera settings, such as shutter speeds and aperture settings, has now been developed. This system employs electrical switching devices designed to be coupled to the setting adjustment mechanism of a camera for encoding the outputs of a pair of optical display assemblies. Each of the display assemblies includes a plurality of electroluminescent devices for recording optical images on the edge portions of photographic film contained in the camera.

The purpose of the unique system described in my previous patent is to automatically record camera settings on photographic negatives at the instant at which the negatives are exposed. This arrangement is extremely useful to professional and sophisticated amateur photographers since it eliminates the cumbersome and often unreliable techniques previously used for recording camera settings. The recording system is made practical by the use of miniaturized light sources, such as light emitting diodes which may be mounted in a camera back or in a film backing plate within a camera. However, the use of light emitting diodes (LEDs) has presented a problem in that diodes of this type are essentially point light sources so that resulting photographic exposures tend to have significant variations in contrast. Accordingly a need exists for a technique of counteracting the "point source" nature of LEDs in the environment of a photographic recording apparatus of the type described. Naturally, any device which would provide the desired effect must also meet the miniaturization and mounting requirements imposed by the fact that the system is intended to be mounted within a camera.

A further problem in implementing the recording system described above resides in the electrical switches designed to be coupled to the camera aperture and exposure time setting mechanisms. It is desirable that a relatively universal switching assembly be constructed so that the system in question can be installed on a wide range of camera types both during and after assembly of the cameras. A need therefore exists for an improved switch structure of wide ranging applicability which can be easily installed on many different types of cameras.

SUMMARY OF THE INVENTION

Accordingly, one object of the present invention is to provide an improved system for recording camera settings on photographic film.

Another object of the present invention is the provision of a unique system for counteracting the point source nature of light emitting diodes.

Yet another object of the present invention is the provision of a unique switching structure which is easily mounted on a wide range of cameras.

A still further object of the present invention is the provision of novel switching and light diffusing apparatuses for improving the performance and extending the utility of a system for recording camera settings on photographic film.

Briefly, these and other objects of the invention are achieved by providing a light diffusing aperture in the film backing plate, or equivalent structure, of a photographic camera. A display of electroluminescent devices, such as LED's, is mounted in the film backing plate and each LED is oriented to project a light beam into a light diffusing aperture. Several embodiments of arcuate switching structures designed to be easily mounted to a wide variety of cameras are provided for controlling the LED displays.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 is an illustration of a third embodiment of an arcuate switch structure

FIGS. 10A, 10B and 10C are illustrations of various alternative contact structures for the switch structure of FIG. 8; and FIG. 11 is a block diagram illustrating an electrical circuit useful with the apparatus of the present invention.

DESCRIPTION OF THE PREFERRED EMBODIMENTS

Figure 1:
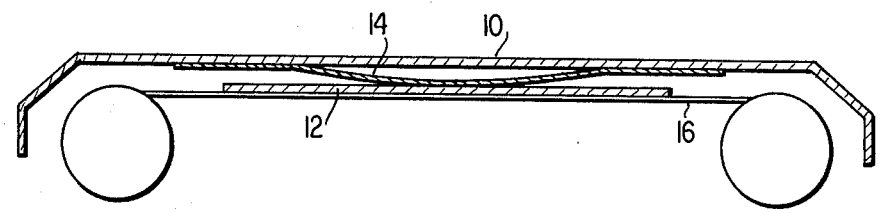
FIG. 1 is a top view of a camera back showing the position of a film backing plate.

Referring now to the drawings, wherein like reference numerals designate identical or corresponding parts throughout the several views, and more particularly to FIG. 1 thereof, a conventional camera back 10 is shown. The camera back 10 is preferably a completely detachable camera back of the type included on many 35 millimeter cameras, such as the Nikon Model F camera, although the camera back may be any type of completely or partially removable camera back, as is described in my previous application, referenced above.

A film backing or pressure plate 12 is resiliently mounted to the camera back 10 by means of a pair of conventional leaf springs 14. A conventional film strip 16, of 35 mm. film for example, is shown engaging the film backing plate as it normally would when the camera back 10 is in its closed position.

Figure 2:
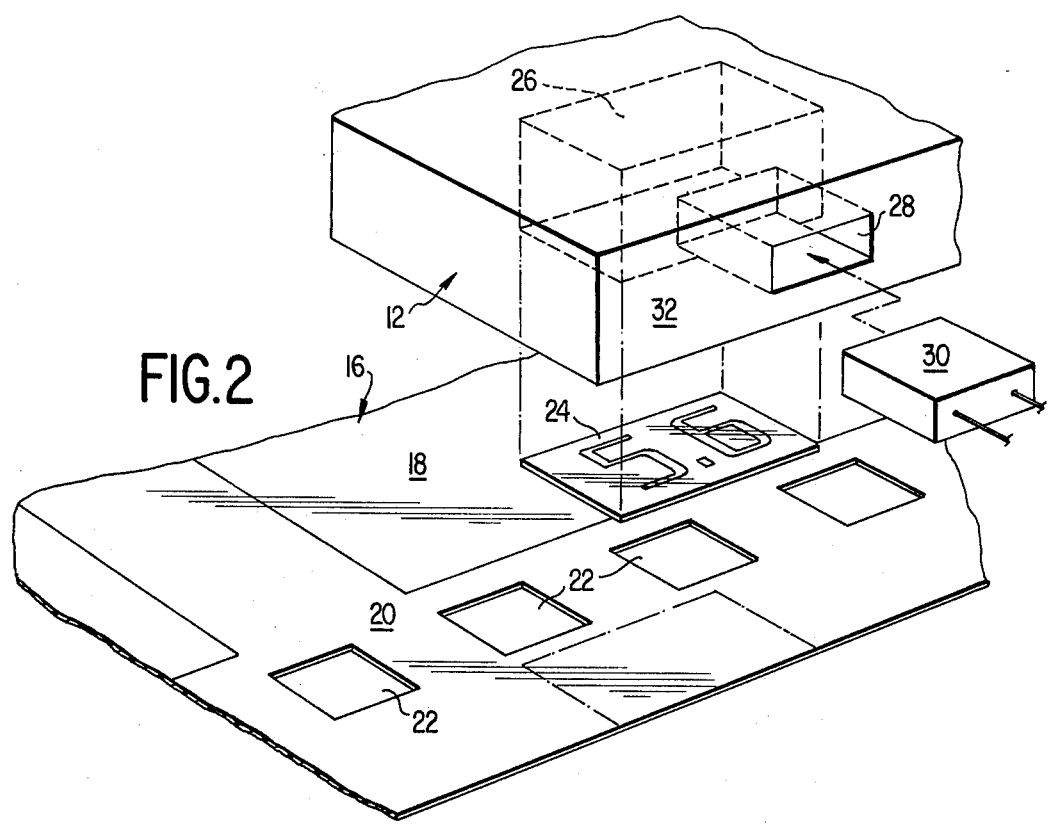
FIG. 2 is a perspective illustration of one embodiment of the reflecting chamber structure of the present invention.

Referring now to FIG. 2, a portion of the film backing plate 12 is shown greatly enlarged along with a segment of the film strip 16. As is well known to those skilled in the photographic arts, the conventional film strip 16 normally includes a picture or negative area 18 on opposite sides of which are located border areas 20 containing sequences of sprocket holes 22. It is the object of the system disclosed in my aforementioned patent to photographically imprint indicia, such as camera aperture and exposure time settings on the film strip 16 in the area of the border areas 20 not occupied by the sprocket holes 22. An example of such indicia is the numeral 5.6 illustrated on a portion of a stencil plate 24.

The stencil plate 24 is adapted to carry a series of transparent numerals representing various camera exposure time or aperture settings. The stencil 24 is designed to interfit with or engage a surface of the film backing plate 12 which is adjacent to the appropriate border area 20 of the film strip 16. A series of reflecting chambers, one of which is shown at 26, are punched or otherwise formed in the film backing plate 12. Each reflecting chamber is preferably punched entirely through the material of the backing plate, and the open upper end (that is, the end of the reflecting chamber facing away from the film) is preferably sealed with a piece of aluminum or brass shim stock. The stencil plate 24 is placed between the opening of the reflecting chamber adjacent to the film strip 16 and the film strip itself. The stencil plate 24 may take any one of a number of forms. For example, a small clear stencil may be produced by photographing the desired series of numbers using a high contrast film which forms a very good negative. The resulting black figures on a white background produce a negative that is directly useable as a stencil. This negative may also be used to make a print on a plastic, such as mylar, to produce a stencil with a substantially opaque background. A clear plastic base may also be used for the print instead of mylar, and other materials such as photographically etched copper and the like can likewise be used to form the stencil. The thickness of the lines forming the numerals in the stencil can be used to control the image intensity and sharpness. Naturally, other techniques of controlling image brightness and sharpness, such as controlling the power supplied to the LED light sources can also be used.

Returning again to the reflecting chamber structure, each of the chambers 26, which are preferably essentially rectangular apertures, includes an opening or tunnel 28 into which an LED 30 is inserted. The tunnel 28 penetrates from one edge of the film backing plate 32 into the reflecting chamber 26. The cross-sectional configuration of the tunnel 28 preferably conforms to that of the LED 30 so that a suitably close fit may be obtained upon insertion of the LED.

The LED 30 is inserted into the tunnel so that its light output is directed along the axis of the tunnel 28 into the reflecting chamber 26. The resulting light from the LED is reflected about the inside of the reflecting chamber 26 to produce a very even, homogenous light output covering the entire adjacent area of the stencil plate 24. Thus, the reflecting chamber 26 eliminates the bright spots or intensity fluctuations normally associated with LED outputs. Accordingly the reflecting chamber 26 provides a substantial improvement in the quality of the output image in comparison to a system in which the LED output is directly projected on a stencil plate without the use of a reflecting chamber. The reflecting chamber has also proven to substantially brighten the output image and render it substantially more clear than was previously possible. Furthermore, the reflecting chamber provides the added advantage of enabling the LEDs 30 to be mounted in a plane parallel to the plane of the film backing plate 12. Thus the LEDs can be easily mounted in an edge portion of the backing plate 20 rather than perpendicular to it so that the resulting assembly may be made substantially thinner than was possible in the past. The thinner assembly is advantageous in the environment of a camera since room is generally available above and below the film backing plate, but not necessarily behind or in front of it. Thus the reflecting chamber of the present invention both improves the quality of the image produced by the apparatus of the present invention and also simplifies the mounting of the present invention to conventional camera structures.

Figure 3:
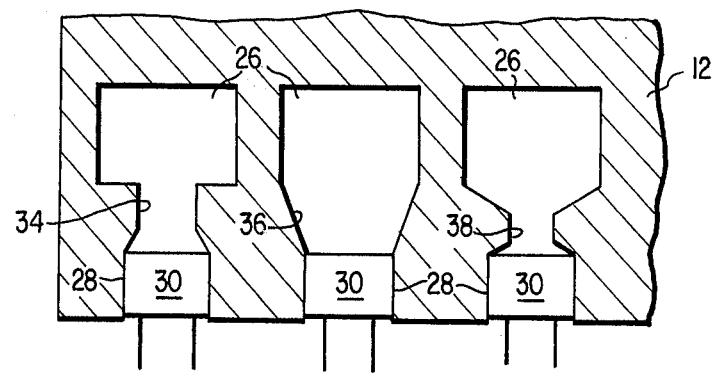
FIG. 3 is an illustration of a modified form of reflecting chamber showing a technique for varying the amount of light transmitted to the reflecting chamber.

Referring now to FIG. 3, a further modification of the reflecting chamber structure of the present invention is shown. In FIG. 3 the film backing plate 12 is shown as including three reflecting chambers 26. The reflecting chambers, which are shown in plan view, each include a tunnel 28 connected to the main reflecting chamber 26 by means of a different shaped throat configurations 34, 36 and 38, respectively. The different throat structures permit control of the amount of light passed from the LED 30 into the reflecting chamber 26. For example, the throat structures 34 and 38 are substantially narrower than the throat structure 36, whereby substantially less light is passed through the throat structures 34 and 38. The throat structures 34 and 38 differ from one another in that the throat structure 34 includes a pair of flattened protrusions which restrict the aperture between throat 28 and reflecting chamber 26. The throat structure 38 is similar to throat structure 34, but includes a pair of pointed protrusions, while the throat structure 36 is fully open, with no restriction between the tunnel 28 and the reflecting chamber 26. The various throat structures can be selected for particular applications depending upon the percentage of the overall LED beam desired to enter the reflecting chamber 26. Many other shapes and dimensions of throat structures are also possible, as will be apparent to those skilled in the art. The structure illustrated in FIG. 3 is merely representative of three different throat structures, and is not intended to represent an operative unit. Normally, all throat structures for a particular apparatus would be constructed to have the same dimensions.

Figure 4:
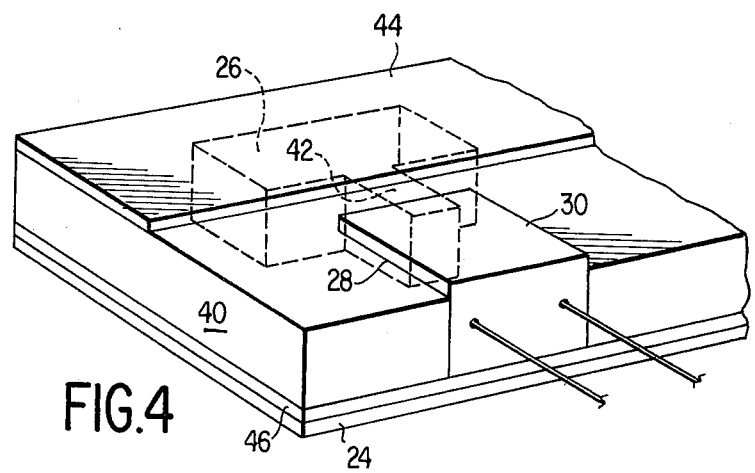
FIG. 4 is a perspective illustration of another embodiment of the reflecting chamber structure of the present invention.

Referring now to FIG. 4, a built-up reflecting chamber structure is shown. In this embodiment of the invention a base plate 40 is initially punched with a series of apertures for forming reflecting chambers 26, tunnels 28 and rectangular throats 42. The shapes of the reflecting chambers and throats may, of course, be modified at will, as will be apparent to those skilled in the art. The base plate 40 may be thinner than the LEDs 30 which are mounted in it, as shown in the FIG. A thin sheet of brass or aluminum shim stock, or an equivalent material, 44 is placed over the base plate 40 to cover the reflecting chambers 26 and the throat portions 42 in order to prevent light from escaping from the open upper portion of the reflecting chamber and to provide a surface for reflecting light toward the stencil plate 24.

A second sheet of shim stock, or an equivalent material, 46 is placed over the lower surface of the base plate 40 to retain the LEDs 30 in place and to enclose the throat portions 42, as well as to close any gaps around the LEDs 30 in order to prevent light from penetrating therethrough. Apertures are punched in the sheet of shim stock 46 corresponding to the positions of the reflecting chambers 26 so that light will be projected through the shim stock 46 to the stencil 24. The apertures punched in the shim stock 46 may be identical in configuration with those of the reflecting chambers, or may be modified in shape to conform more closely to the numerals or indicia formed on the stencil 24. The stencil 24 is subsequently placed over the exposed surface of the second sheet of shim stock 46 to substantially complete the assembly. If the stencil 24 is made of a suitably opaque material, the sheet of shim stock 46 may be omitted in some embodiments of the present invention.

Figure 5:
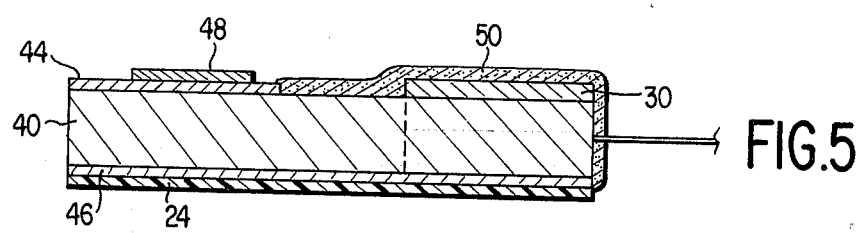
FIG. 5 is a side view of the reflecting chamber structure shown in FIG. 4.

Referring now to FIG. 5, an end view of the structure shown in FIG. 4 is illustrated, further showing the completed details of the assembly. A spring 48, which may be one of leaf springs 14, may be placed over the shim stock 44 to hold it in place. Alternatively, the shim stock 44 may be glued, welded or otherwise fastened to the base plate 40. The same is true of the second sheet of shim stock 46 and the stencil plate 24. The LEDs 30 are preferably coated with a black, opaque paint over all surfaces except that facing into the tunnel 28 in order to prevent the escape of extraneous light from the LEDs. Alternatively, the LEDs may be covered with tape, fiberglass, aluminum foil, or an equivalent material coated with epoxy or glue and subsequently painted black to make the structure light tight. The light tight LEDs are then inserted into the tunnels 28 and sealed in place with a layer of epoxy or glue 50. It is preferable that black, opaque epoxy is used for the layer 50, although other equivalent materials may also be used.

A modified form of the invention may be produced by filling the reflecting chambers 46, the throat portions 42 and any exposed areas of the tunnel 28 with translucent epoxy or plastic filler. This arrangement produces a highly satisfactory effect in further diffusing light emitted by the LEDs 30 resulting in a very high quality image, while at the same time solidifying the entire assembly and making it structurally rigid.

The reflecting chamber structure of FIG. 4 may also be modified by forming the rear wall of the chamber (i.e. the wall opposite the LED) at a 45° angle for reflecting additional light toward the stencil. Naturally the embodiment of FIG. 2 can be similarly modified, and other suitable angles can be used for the rear wall.

Figure 6:
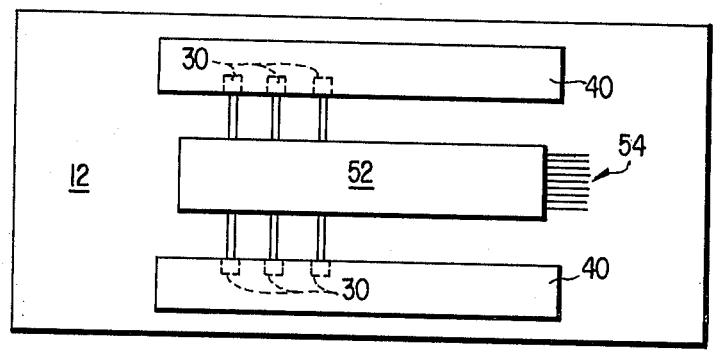
FIG. 6 is an illustration of a modification of the reflecting chamber structure of the present invention shown in FIGS. 2 and 4.

FIG. 6 illustrates the manner in which the assemblies illustrated in FIGS. 4 and 5 may be mounted in the film backing plate 12. As shown in FIG. 6, a pair of elongated apertures may be punched in the film backing plate 12 for accommodating the base plates 40 and their attached assemblies including the LEDs 30. A printed circuit board or equivalent printed circuit structure 52 attached to a surface of the film backing plate 12 is then coupled to the electrical leads of all of the LEDs 30 for completing the electrical interconnection arrangements. A series of conventional contact pins 54 are provided on the printed circuit board 52 so that the conductors on the printed circuit board can be coupled to the remaining electrical components of the system.

Figure 7:
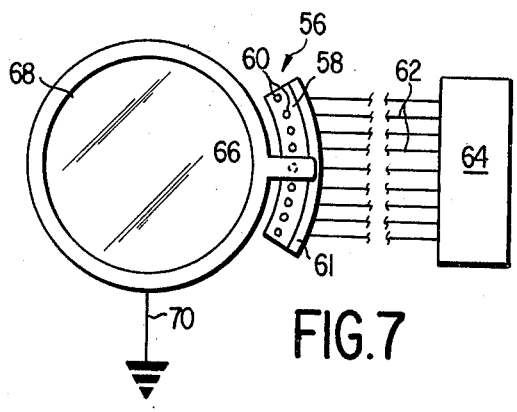
FIG. 7 is an illustration of one embodiment of an arcuate switch structure.
Figure 8:
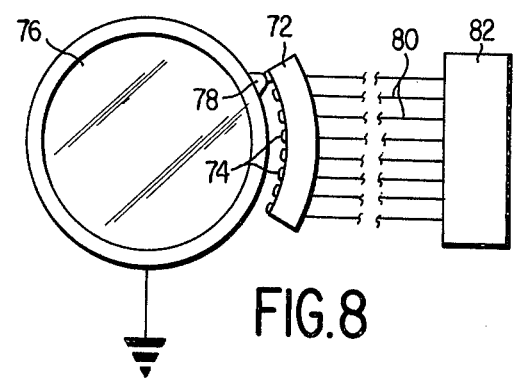
FIG. 8 is an illustration of a second embodiment of an arcuate switch structure.

Referring now to FIGS. 7, 8 and 9, three different multiple contact switch structures for use with the apparatus of the present invention are shown. In FIG. 7, a first switch structure 56 is illustrated. This structure includes an arcuate panel 58 carrying a series of contacts 60 and a common contact 61, all of which are coupled to suitable output leads as illustrated at 62. The output leads 62 are coupled to a female plug 64 adapted to engage the contact pins 54 of the printed circuit board 52 or a similar contacting apparatus. A power source and various other circuit components disclosed in my previous application may be incorporated into the circuit, as shown in FIG. 11, discussed subsequently. A single contact element 66 coupled to a rotatable lens mount 68 is positioned to sweep over and sequentially engage the various contacts 60 and the common contact 61 so that the contact element 60 engages a different one of the contacts 60 depending upon the angular position of the lens mount 68. In this manner various aperture or shutter speed settings to which the lens mount or barrel is set may be encoded into electrical signals and transmitted to the LED display previously described. The contact element 66 may be electrically coupled to the lens mount or barrel which may be grounded, as indicated at 70, if it is desired not to use the common contact 61.

A modified switch structure is shown in FIG. 8 which includes an arcuate body 72 having a series of contacts 74 mounted on the curved face thereof and facing inwardly toward a lens barrel 76. A single movable contact 78 is mounted to the lens barrel, and is in electrical contact therewith to provide a means of engaging the various contacts 72 on the arcuate body 74. Again, suitable lead wires 80 and a suitable plug 82 are provided for coupling the contacts 72 with an LED display.

FIG. 9 shows yet another switch structure wherein a series of contacts 84 are mounted in a contact carrying body 86 and are coupled to a plurality of lead wires 88. A movable contact which may be mounted in an existing camera coupling pin 90 is fixed to a lens barrel 92 for rotation therewith. The movable contact pin 90 is arranged, as shown in FIG. 9B to slide along the surface of the contact carrying body 86 in an arcuate path and engage the various contacts 84 sequentially, again providing a means of converting the angular position or setting of the lens barrel 92 into electrical signals.

Further structure modifications of the switch structure of FIG. 8 are shown in FIGS. 10A, 10B and 10C. FIG. 10A illustrates a wiper 92 which can be used as the movable contact 78. The wiper 92 is preferably formed in a generally U-shape of a resilient metal having good electrical conducting properties to provide a good mechanical and electrical connection with the contacts 74. As shown in FIG. 10B, the wiper 92 may also be formed of a pair of U-shaped contact elements separated by a slot 94 and mounted on an insulating or conductive base 96. This arrangement separates the wiper 92 into two separate contacts which can be mounted as shown in FIG. 10C. One of the separate wiper contacts can be used as a common contact while the other is used for engaging the individual contacts 74. The wiper 92 may be secured to the lens 76 by means of a band surrounding the lens. This feature would require securing a wiper to each lens to be used with a camera, but would permit changing lenses without adjusting the wiper contact.

As an alternative to the flexible wiper structure illustrated in FIGS. 10A–10C, the arcuate body 72 may be formed of a flexible material and secured to the camera body only at the extremities thereof. The arcuate body thus possesses some resilience and permits a continuous firm engagement between the movable and stationary contacts to be maintained.

FIG. 11 illustrates an electrical network for coupling the components of the present invention. The electrical network includes a power supply 98, such as a conventional battery, coupled through a variable resistor 100 to a pair of LED displays 102 and 104. The variable resistor is used to control the brightness of the LED displays in accordance with the ASA ratings of films being used to optimize the quality of the final indicia image. The variable resistor may be coupled to the ASA setting mechanism of a camera 107 so that the LED display brightness is automatically adjusted as the proper ASA setting is made.

The LED displays are preferably of the type described above and in my previous patent, and are coupled to a pair of selector switches 106 and 108, respectively, constructed in accordance with the disclosure set forth herein. The selector switches are coupled to the aperture and exposure time setting mechanism of the camera 107 to provide automatic selection of the proper LED display when the desired camera settings are made.

A trigger switch 110 is provided to supply power to the LED displays when the camera shutter is activated, whereby the LED displays automatically record the shutter speed and aperture settings of the camera on each film negative as it is exposed.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patentent of the United States is:

1. An improved system for automatically recording images representative of camera settings on photographic film comprising:
    a film backing member of engaging said film within said camera,
    display means mounted in said film backing member and including a plurality of light emitting electroluminescent devices adapted to record coded images on said film, said electroluminescent devices selectively energizable to form a plurality of said coded images;
    light diffusing means including reflecting chambers formed in said film backing member associated with said light emitting electroluminescent devices for diffusing light emanating therefrom,
    multiple position selector means designed to be coupled to said camera for movement with camera setting mechanisms for identifying selected settings thereof, said selector switch coupled to said display means for varying said coded images.

2. An improved system as in claim 1 wherein said light diffusing means further comprises:
    a first opening in said film backing member in communication with said reflecting chamber,
    stencil means positioned adjacent said first opening,
    a second opening in said film backing member, said second opening including a tunnel portion,
    a light emitting electroluminescent device mounted in said tunnel portion for projecting light into said reflecting chamber.

3. An improved system as in claim 2, wherein said light diffusing means further comprises:
    throat means in said second opening for limiting the amount of light entering said reflecting chamber.

4. An improved system as in claim 1, wherein said film backing member comprises:
    a built-up structure including as one component thereof a film backing plate.

5. An improved system as in claim 2, further comprising: opaque cement securing said light emitting electroluminescent device to said tunnel portion of said film backing member.

6. An improved system for automatically recording images representative of camera exposure settings on photographic film within a camera, said improved system comprising:
    display means for recording coded images on the photographic film, said display means including a plurality of light-emitting electroluminescent devices selectively energizable to form a plurality of coded images;
    light diffusing means associated with each of said light-emitting electroluminescent devices for diffusing light emanating therefrom; and
    multiple position selector switch means adapted to be coupled to the camera for identifying selected exposure settings thereof, said selector switch means coupled to said display means for varying the coded images in response to changes in the selected camera exposure settings, wherein said multiple position selector switch means includes a switch body adapted to be mounted to the camera body, a plurality of space contacts secured to said switch body, movable contact means for selectively contacting each of said spaced contacts, said movable contact means adapted to be secured to an exposure setting mechanism of the camera for movement therewith.

7. An improved system as in claim 6, wherein:
    said switch body is formed of a resilient material and is adapted to be secured to said camera body only at the extremities thereof.

8. An improved system as in claim 6, wherein said movable contact comprises:
    a generally U-shaped wiper formed of a resilient conductive material.

9. An improved system as in claim 6, wherein said movable contact comprises:
    a pair of separated generally U-shaped resilient conductive wiper elements.

10. An improved system for automatically recording images representative of camera settings on photographic film comprising:

display means including a plurality of light emitting electroluminescent devices adapted to record coded images on said film, said electroluminescent devices selectively energizable to form a plurality of said coded images;

light diffusing means associated with each of said light emitting electroluminescent devices for diffusing light emanating therefrom, multiple position selector switch means adapted to be coupled to said camera for identifying selected settings thereof, said selector switch coupled to said display means for varying said coded images in response to changes in said selected camera settings;

power supply means for energizing said display means, variable resistor means coupled to said power supply means for adjusting the power delivered to said display means whereby the intensity of the light emitted by said light emitting electroluminescent devices is varied; and, trigger switch means coupled to said camera for switching on said display means when a shutter mechanism of said camera is activated.

11. An improved system as in claim 10, further comprising:

means coupled to said variable resistor means for linking said variable resistor means with said camera whereby said variable resistor means is adjusted to conform to ASA settings of said camera.

12. An extremely compact system for automatically recording information directly on photographic film within a camera, said system comprising:

means adapted to be positioned inside the camera for backing photographic film within the camera;

electroluminescent display means mounted in said film backing means for recording selectable data on the photographic film;

said electroluminescent display means including a plurality of selectively activatable light sources, selector switch means coupled to said plurality of selectively activatable light sources for selectively controlling the energization of said light sources in response to said information to be recorded; and, means formed in said film backing means for diffusing light from said electroluminescent device onto said film.

13. An extremely compact system for automatically recording photographic camera settings directly on photographic film within a camera, said system comprising:

means adapted to be positioned inside the camera for backing photographic film within said camera, electroluminescent display means mounted in said film backing means for recording selectable data on said photographic film, said electroluminescent display means including at least one electroluminescent device activatable to emit light, means formed in said film backing means for diffusing light from said electroluminescent device onto said film; and, camera setting responsive means coupled to said electroluminescent display means for adjusting said selectable data in response to differing camera settings.

* * * * *